United States Patent
Belmarsh et al.

(10) Patent No.: US 10,268,259 B2
(45) Date of Patent: Apr. 23, 2019

(54) EXPANDING FUNCTIONS OF A PROCESS DEVICE

(71) Applicant: Dresser, Inc., Addison, TX (US)

(72) Inventors: Robert Steven Belmarsh, Hull, MA (US); Jagadish Gattu, Southborough, MA (US); Yanli Liu, Shanghai (CN); Lei Lu, Westwood, MA (US); Anatoly Podpaly, Sharon, MA (US); Justin Scott Shriver, Newton, MA (US)

(73) Assignee: Dresser, LLC, Addison, TX (US)

( * ) Notice: Subject to any disclaimer, the term of this patent is extended or adjusted under 35 U.S.C. 154(b) by 177 days.

(21) Appl. No.: 15/159,002

(22) Filed: May 19, 2016

(65) Prior Publication Data
US 2017/0269676 A1    Sep. 21, 2017

(51) Int. Cl.
| | |
|---|---|
| *G01F 1/36* | (2006.01) |
| *G06F 1/3287* | (2019.01) |
| *G06F 1/20* | (2006.01) |
| *G05B 19/042* | (2006.01) |
| *G06F 11/30* | (2006.01) |

(52) U.S. Cl.
CPC ....... *G06F 1/3287* (2013.01); *G05B 19/0421* (2013.01); *G06F 1/206* (2013.01); *G06F 11/3051* (2013.01); *G05B 2219/37333* (2013.01)

(58) Field of Classification Search
None
See application file for complete search history.

(56) References Cited

U.S. PATENT DOCUMENTS

| | | | | | |
|---|---|---|---|---|---|
| 5,573,032 | A | * | 11/1996 | Lenz | G05D 7/005 137/486 |
| 6,155,283 | A | * | 12/2000 | Hansen | G05B 13/042 137/1 |
| 7,124,041 | B1 | * | 10/2006 | Johnson | G05B 9/02 702/58 |

(Continued)

FOREIGN PATENT DOCUMENTS

| | | |
|---|---|---|
| CN | 1914573 A | 2/2007 |
| CN | 202812435 U | 3/2013 |

(Continued)

OTHER PUBLICATIONS

International Search Report and Written Opinion issued in connection with corresponding PCT Application No. PCT/CN2016/076476 dated Dec. 14, 2016.

*Primary Examiner* — Amine Riad
(74) *Attorney, Agent, or Firm* — Paul Frank + Collins P.C.

(57) ABSTRACT

A board-level assembly that is useful to expand functions of a valve positioner on a valve assembly. The board-level assembly can incorporate a main circuit board and a peripheral "smart" circuit board. The main circuit board may be configured to communicate with the smart circuit board, find a storage memory on the second circuit board, retrieve data from the storage memory, and use the data to configure functions on the first circuit board. In one implementation, the smart circuit board can release and engage the main circuit board. This configuration can allow different configurations of the smart circuit board to swap into the board-level assembly, each of the different configurations providing data the main circuit board can exploit to change the functions of the valve positioner.

19 Claims, 9 Drawing Sheets

(56) References Cited

U.S. PATENT DOCUMENTS

| | | | | |
|---|---|---|---|---|
| 7,134,070 B2* | 11/2006 | Thakur | ............... | G06F 11/1004 |
| | | | | 714/807 |
| 7,177,915 B2* | 2/2007 | Kopchik | ................. | G06F 21/34 |
| | | | | 709/217 |
| 7,640,079 B2 | 12/2009 | Nickerson et al. | | |
| 9,246,886 B2* | 1/2016 | Hueber | ................... | G06F 21/72 |
| 9,536,377 B2* | 1/2017 | Hollander | ............ | G07F 17/3202 |
| 2002/0017625 A1 | 2/2002 | Rudle et al. | | |
| 2002/0184410 A1* | 12/2002 | Apel | ..................... | G06F 9/4411 |
| | | | | 710/5 |
| 2007/0247826 A1* | 10/2007 | Grady | .................. | H05K 7/1492 |
| | | | | 361/796 |
| 2008/0142352 A1* | 6/2008 | Wright | ................... | G06F 3/044 |
| | | | | 200/600 |
| 2008/0182435 A1* | 7/2008 | Ho | ....................... | H01R 35/025 |
| | | | | 439/77 |
| 2008/0282471 A1* | 11/2008 | Chambers | .......... | A61G 7/05769 |
| | | | | 5/616 |
| 2010/0059129 A1* | 3/2010 | Hamer | ............... | F15B 13/0839 |
| | | | | 137/613 |
| 2011/0270814 A1* | 11/2011 | Bailey | .................. | G06F 3/0607 |
| | | | | 707/706 |
| 2015/0288523 A1* | 10/2015 | Burghardt | ............... | G06F 21/34 |
| | | | | 726/20 |

FOREIGN PATENT DOCUMENTS

| | | |
|---|---|---|
| CN | 204201234 U | 3/2015 |
| CN | 104702704 A | 6/2015 |

\* cited by examiner

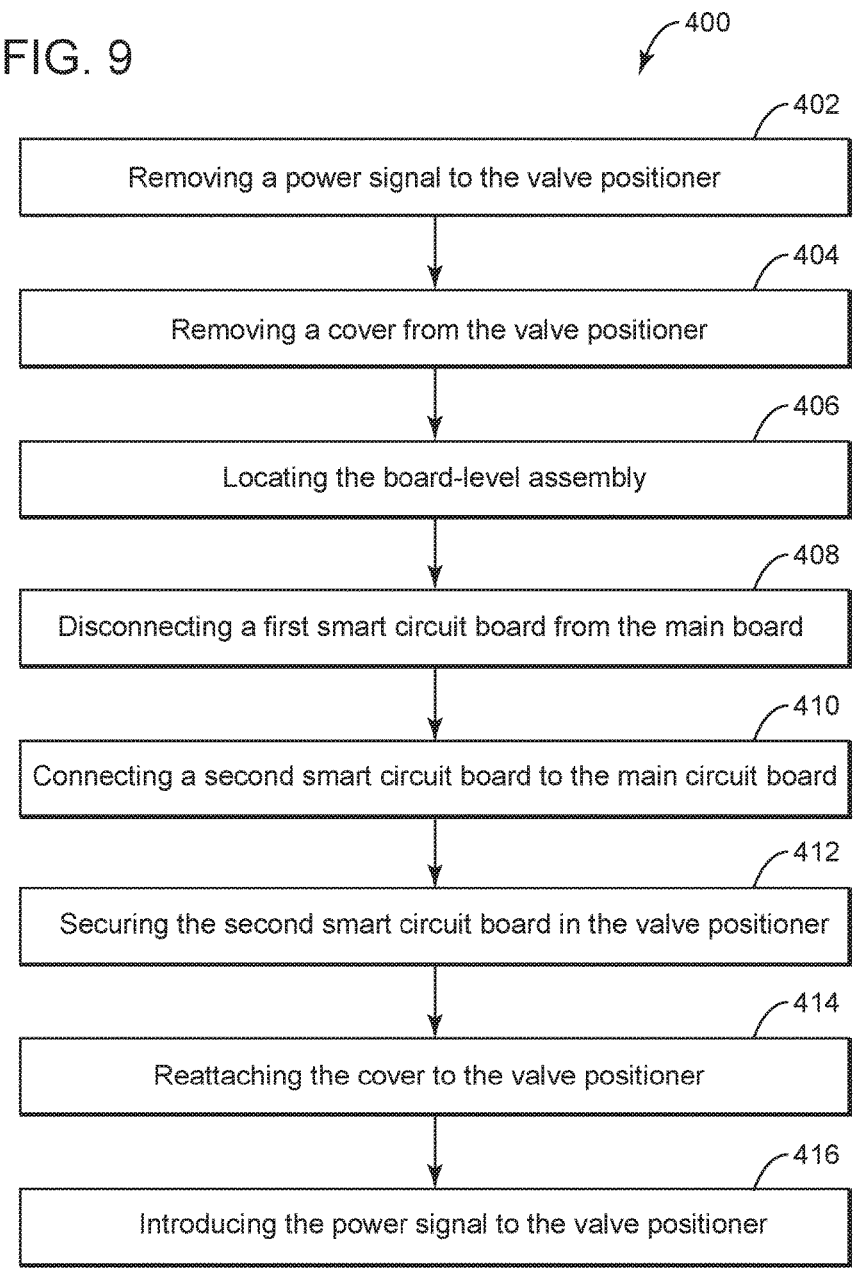

EXPANDING FUNCTIONS OF A PROCESS DEVICE

CROSS-REFERENCE TO RELATED APPLICATIONS

This application claims the benefit of International Application No. PCT/CN2016/076476, filed on Mar. 16, 2016, and entitled "EXPANDING FUNCTIONS OF A PROCESS DEVICE," the content of which is incorporated by reference herein in its entirety.

BACKGROUND

Engineers expend great efforts to improve performance of industrial machines. Often, hardware constraints can frustrate these efforts because the hardware lacks appropriate functionality and because any improvements can increase costs and/or add complexity to the machine.

SUMMARY

The subject matter of this disclosure relates to industrial processes. Of particular interest in this disclosure are improvements that can change and expand functionality of process devices without undue changes in hardware and software. These process devices may find use on process lines that transfer and distribute materials including solids and fluids (e.g., gases and liquid). Valve assemblies are one type of process device, for example, that can regulate flow of materials in process lines for the chemical industry, refining industry, oil & gas recovery industry, and the like.

Some embodiments may include a peripheral device in the form of a circuit board that can couple (and decouple) with electronics, power, and structure on the process device. Examples of this circuit board (also "smart" board) can store data including executable instructions in the form of computer programs (e.g., software, firmware, etc.). This data may define new features and functions not previously available by way of the configuration of the process device as manufactured, found in the field, or on the process line.

Some embodiments may include a controller that may couple with the smart board. On valve assemblies, the controller may embody a valve positioner. This device may include a main circuit board that is configured, typically with executable instructions, for processing data to manage operation of the valve assembly. The main circuit board may be configured to also communicate with the smart board. In one implementation, such configurations may automatically implement the new features and functions that correspond with the data on the smart board, effectively changing or updating the operating "personality" of the valve assembly independent of the pre-existing configuration (including hardware and software) of the device.

Hardware on some embodiments can vary as necessary to accommodate its operation on the process line. For valve assemblies, the hardware may include an actuator that couples with a closure member (via a stem). The closure member may embody a plug, a ball, a butterfly valve, and/or like implement that can contact a seat to prevent flow. Actuators that rely on pneumatics may be useful to facilitate movement of the closure member. The embodiments may also have a sensing mechanism to monitor the position of the closure member. This sensing mechanism may use a position sensor and a mechanical linkage that couples the position sensor with the stem or other structure that moves in concert with the closure member.

The controller may serve to exchange signals with a process control system (also "distributed control system" or "DCS system"). This configuration can instruct operation of process devices on the process line. The control signals may define operating parameters for the process device that correspond to processes on the process line. On valve assemblies, the valve positioner may use the operating parameters in combination with, for example, input from the position sensor, to regulate instrument gas to the actuator in order to set the position required for the closure member. This position may achieve appropriate flow of material through the valve assembly into the process line to satisfy the process.

Use of the smart board and related improvements benefit process devices in a number of ways. Introducing new functionality to the process device via the smart board can reduce and, even, avoid downtime that might occur in connection with upgrades directly to the main circuit board. This new functionality (from adding the smart board) occurs instead of re-designs to the configuration of the process device that could result in costly changes to hardware and software. And while useful in the field, the smart board may also benefit manufacture of process devices because construction can leverage the smart board to add and/or customize features and functions to a "standard" or "default" configuration for the main circuit board. In practice, the smart board can customize a particular product for a specific customer and/or application, offering an effective solution to reduce inventory and simplify part management and manufacture for the process devices.

BRIEF DESCRIPTION OF THE DRAWINGS

Reference is now made briefly to the accompanying drawings, in which:

FIG. 9 depicts a flow diagram of an exemplary embodiment of a method for updating functions on a valve assembly.

Figure 1:
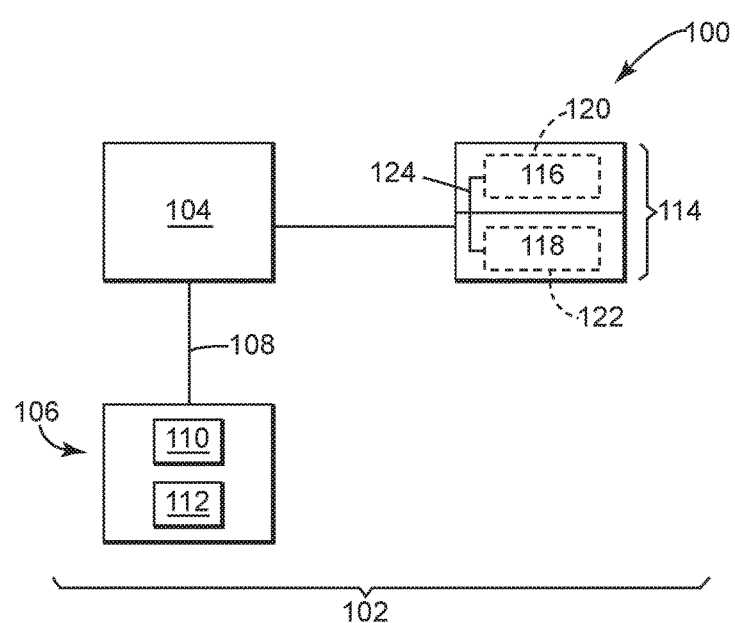
FIG. 1 depicts a schematic diagram of an exemplary embodiment of a controller that may find use as a valve positioner in a valve assembly that can regulate flow of a working fluid.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes various embodiments of a valve positioner and a valve assembly. These embodiments incorporate improvements that expand functionality of these devices independent of the original configuration (e.g., hardware and software) of the device in its present state. Other embodiments are within the scope of the subject matter.

FIG. 1 illustrates a schematic diagram of an exemplary embodiment of a controller 100. This embodiment is part of a valve assembly, shown generally and enumerated by the numeral 102. As noted herein, the controller 100 can embody a valve positioner that operates the valve assembly 102 to perform on a process line. The valve assembly 102 can include an actuator 104 that couples with a valve 106 using a valve stem 108 interposed therebetween. The valve stem 108 can be configured to cause the actuator 104 to move a closure member 110 relative to a seat 112 on the valve 106. For purposes of the present example, the closure member 110 can embody a plug, typically a solid or piece part device that can engage with the seat 112 to prevent flow of fluids through the valve 106. In one implementation, the valve positioner 100 may include a board-level assembly 114 to facilitate a variety of operative functions including, for example, regulating a pneumatic signal to the actuator 104. This pneumatic signal can locate the plug 110 at a requisite position relative to the seat 112. The board-level assembly 114 can include one or more operative circuit boards (e.g., a first circuit board 116 and a second circuit board 118), each with circuitry (e.g., a first circuit 120 and a second circuit 122). A communication interface 124 may be useful to allow the circuitry 120, 122 to exchange signals.

Broadly, the board-level assembly 114 is configured to allow the operative "personality" of the valve assembly 102 to change independent of the configuration of the valve positioner 100 or other hardware (and software) on the device. The circuit boards 116, 118 communicate with one another to exchange data that can facilitate this feature. The first or "main" circuit board 116 may integrate into the valve positioner 100. While removable, this device is likely a component of the valve positioner 100 that is necessary for the valve assembly 102 to perform its primary functions in response to control signals the valve positioner 100 receives from the DCS system. Such primary functions may operate the actuator 104 to regulate fluid through the valve assembly 102.

The second or "smart" circuit board 118 can couple with the main circuit board 116. The communication interface 124 may provide appropriate devices (e.g., connectors) to facilitate the exchange of signals between the circuit boards 116, 118 when coupled together. At a high level, the smart circuit board 118 can be configured with data that defines peripheral functions that are not available by way of the default configuration of the main circuit board 116. Examples of these peripheral functions may transmit and process data; however, as noted herein, suitable peripheral functions may also include use of the smart circuit board 118 to provide data for use on the main circuit board 116. This data may be useful to calibrate and change settings on the main circuit board 116. The data may also comprise executable instructions that the main circuit board 116 can utilize to update and/or upgrade its software and functionality.

Use of the smart circuit board 118 can greatly expand the range of operation of the valve positioner 100 independent of the hardware found on the main circuit board 116. As noted above, the main circuit board 116 may have a default configuration that defines the primary functions necessary for the valve assembly 102 to operate on the process line. Introduction of the smart circuit board 118 into the board-level assembly 114 can expand the functions of the main circuit board 116 instead of, for example, changes to the hardware of the default configuration and/or other hardware or software changes to the valve positioner 100 or valve assembly 102, generally. In one implementation, the communication interface 124 can be configured with connectors to allow the smart circuit board 118 to replaceably couple with the main circuit board 116. Various types of connectors (e.g., pin-and-socket, USB, etc.) may be useful for this purpose. Suitable connectors may allow a first one of the smart circuit board 118 to swap out of the board-level assembly 114 in favor of a second one of the smart circuit board 118. This "second" smart circuit board 118 may be configured with data that defines different functions than the "first" smart circuit board 118. In one implementation, the main circuit board 116 can automatically initiate communication with the second smart circuit board 118 to access the data. In this way, the main circuit board 116 can integrate the particular functions of the second smart circuit board 118 into the operations of the board-level assembly 114 on the valve positioner 100.

Topology for the circuitry 120, 122 may use arrangements of discrete electrical components. These configurations can include a substrate, preferably one or more printed circuit boards (PCB) of varying designs, although flexible printed circuit boards, flexible circuits, ceramic-based substrates, and silicon-based substrates may also suffice. For purposes of example, a collection of discrete electrical components may be disposed on the substrate to embody the functions of the circuitry 120, 122. Examples of discrete electrical components include transistors, resistors, and capacitors, as well as more complex analog and digital processing components (e.g., processors, storage memory, converters, etc.). This disclosure does not, however, foreclose use of solid-state devices and semiconductor devices, as well as full-function chips or chip-on-chip, chip-on-board, system-on chip, and like designs.

For safety, the topology can be configured to manage power input and distribution on the smart circuit board 118. Such configurations may integrate appropriate power-limiting devices to regulate temperature of components of the circuitry 122. This feature can avoid overheating and sparking of components in proximity to certain flammable, volatile gasses and liquids to mitigate potential hazards (e.g., explosions). Examples of these devices include opto-couplers, photo-couplers, optical isolators, galvanic insulators, and similarly situated devices that can prevent high voltages and currents from affecting other components in either or both of the circuitry 120, 122. In one implementation, the circuitry 122 may use power-limiting devices to maintain component temperatures at or, more favorably, below the flash point of volatile materials that flow on the process line.

The topology can also be configured to address reliability of the valve assembly 102. These configurations may implement certain validation techniques to maintain integrity of the process on the process line. This feature can prevent disruptions to the process or other operational issues that could arise in connection with use of improper hardware in the board-level assembly 114. The validation techniques may include a checksum value, hash sum value, or like data block among the data found on the smart circuit board 118. In use, the main circuit board 116 can read this data block to validate the smart circuit board 118 and, in some examples, all or part of the data stored thereon.

Figure 2:
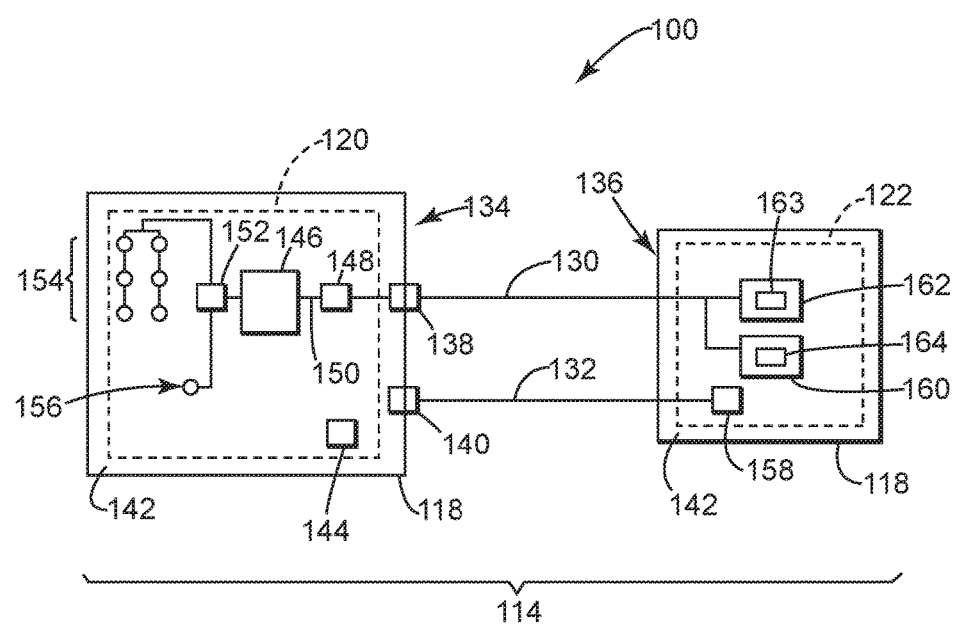
FIG. 2 depicts a schematic diagram of an example of a board-level assembly for use in the controller of FIG. 1.

FIG. 2 depicts a schematic diagram of an example of a base-level topology for the board level assembly 114. The communication interface 124 can include a pair of input/outputs 126, one each disposed in communication with the circuitry 120, 122 of the circuit boards 116, 118, respectively. A cable assembly 128 can extend between the input/outputs 126 to couple the circuit boards 116, 118. The cable assembly 128 may include a pair of cables (e.g., a first cable 130 and a second cable 132). Construction of the cables 130, 132 may comprise one or more combinations of conductive wires to conduct signals between the circuitry 120, 122. These signals may include power signals (e.g., current, voltage, etc.) and data (e.g., analog and digital). The cables 130, 132 can have ends (e.g., a first end 134 and a second end 136) that are configured to interface with the circuitry 120, 122. At the first end 134, the board-level assembly 114 may utilize one or more ports or connectors (e.g., a first connector 138 and a second connector 140). The connectors 138, 140 can allow the cables 130, 132 to release and engage the main circuit board 116. This feature can permit the smart circuit board 118 to swap out of the board-level assembly 114 as noted herein. The second end 136 of the cables 130, 132 may integrate with the second circuitry 122 on the smart circuit board 118. However, it is possible that the board-level assembly 114 may also include connectors (the same and/or similar to connectors 138, 140) to provide releaseable engagement of the cables 130, 132 with the smart circuit board 118.

As noted above, the circuit boards 116, 118 can be configured with discrete electrical components to facilitate operation of the valve assembly 102. Each of the circuit boards 116, 118 can have a substrate 142, shown here as a printed circuit board (PCB) that integrates traces and/or conductive paths to appropriately couple the discrete electrical components disposed thereon. At the main circuit board 116, the first connector 138 can couple with a power supply 144 disposed on-board the substrate 142. The second connector 140 can couple with a microcontroller 146 via a galvanic isolator 148. A bus 150 may be useful to exchange signals between the second connector 140 and the microcontroller 146. The bus 150 may utilize standard and proprietary communication busses including SPI, I²C, UNI/O, 1-Wire, or one or more like serial computer busses known at the time of the present writing or developed hereinafter. Examples of the microcontroller 146 can be fully-integrated with processing and memory necessary to perform operations. In other implementations, the main circuit board 116 may be configured with separate storage memory (e.g., RAM, ROM, etc.) and processors. The microcontroller 146 can couple with a driver circuit 152. Examples of the driver circuit 152 can facilitate operation of various collateral elements on the main circuit board 116 including, for example, a light array 154 and a valve adjustment 156.

The cables 130, 132 can exchange power signals and data signals between the circuit boards 116, 118. At the smart circuit board 118, the first cable 130 can couple with a power connector 158. The second cable 132 can couple with a storage memory 160 and with internal board electronics, identified generally by the box enumerated with the numeral 162. The electronics 162 can include a power-limiting device 163 (e.g., an opto-coupler) to regulate temperature of components of the circuitry 122. Examples of the storage memory 160 can operate as persistent and/or long-term storage, effectively retaining data 164 stored thereon even through a power cycle (e.g., power turned off and back on). These examples include a wide variety of non-volatile computer memory, for example, read-only memory, flash memory, ferroelectric random access memory, and the like.

The collateral elements on the main circuit board 116 may be useful to provide operating indications and features for the valve assembly 102. For example, the light array 154 can include a plurality of light-emitting diodes (LEDs) or similar devices that can emit light. Such devices may be colored, using a lens, to provide certain indications about the operation of the valve assembly 102. In one implementation, the valve adjustment 156 can embody a knob, switch, or like actuatable device. An end user can manipulate this actuatable device to adjust operation of the valve assembly 102.

Figure 3:
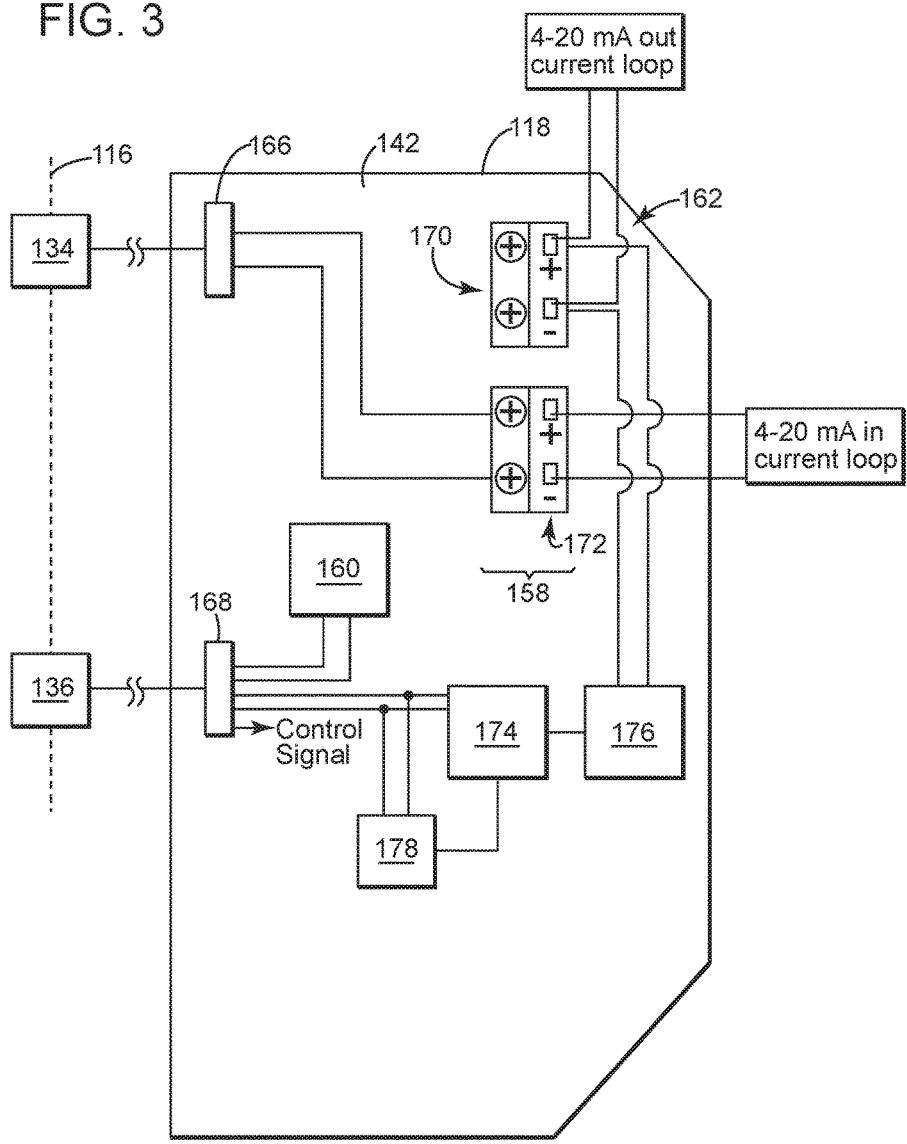
FIG. 3 depicts a schematic diagram of an example of internal electronics for a smart board for use in the board-level assembly of FIG. 2.

FIG. 3 illustrates a schematic diagram of an example of the internal electronics 160 and other components of the smart circuit board 118. The cables 130, 132 can include wires that terminate at a pair of terminals (e.g., a first terminal 166 and a second terminal 168) using a solder joint or similar fastening technique known at the time of the present writing or hereinafter developed. The substrate 142 may include traces that couple the first terminal 166 with the power connector 158, shown here as a power-in connector 170 and a power-out connector 172. The connectors 170, 172 can be configured to function within an analog circuit loop, typically 4-20 mA current loops, that the valve positioner 102 uses for analog signaling. The internal electronics 162 can include a digital-to-analog converter 174 that couples with an analog circuit 176. A supervisory circuit 178 may be useful to maintain the output levels for the converter 174.

Figure 4:
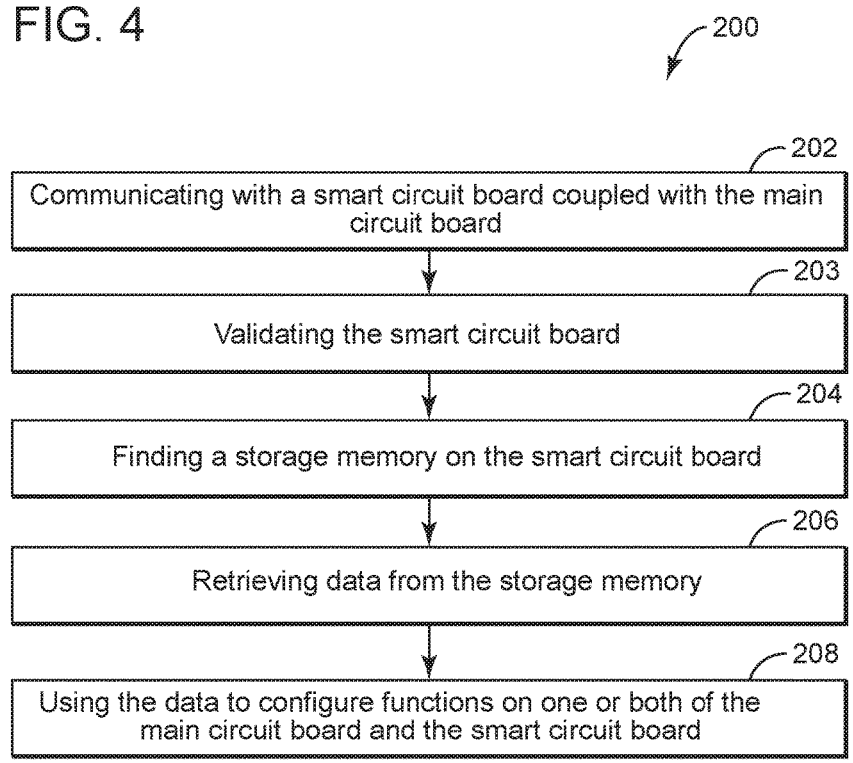
FIG. 4 depicts a flow diagram of an exemplary embodiment of a method for expanding functionality on a process device including, for example, the valve assembly of FIG. 1.
Figure 5:
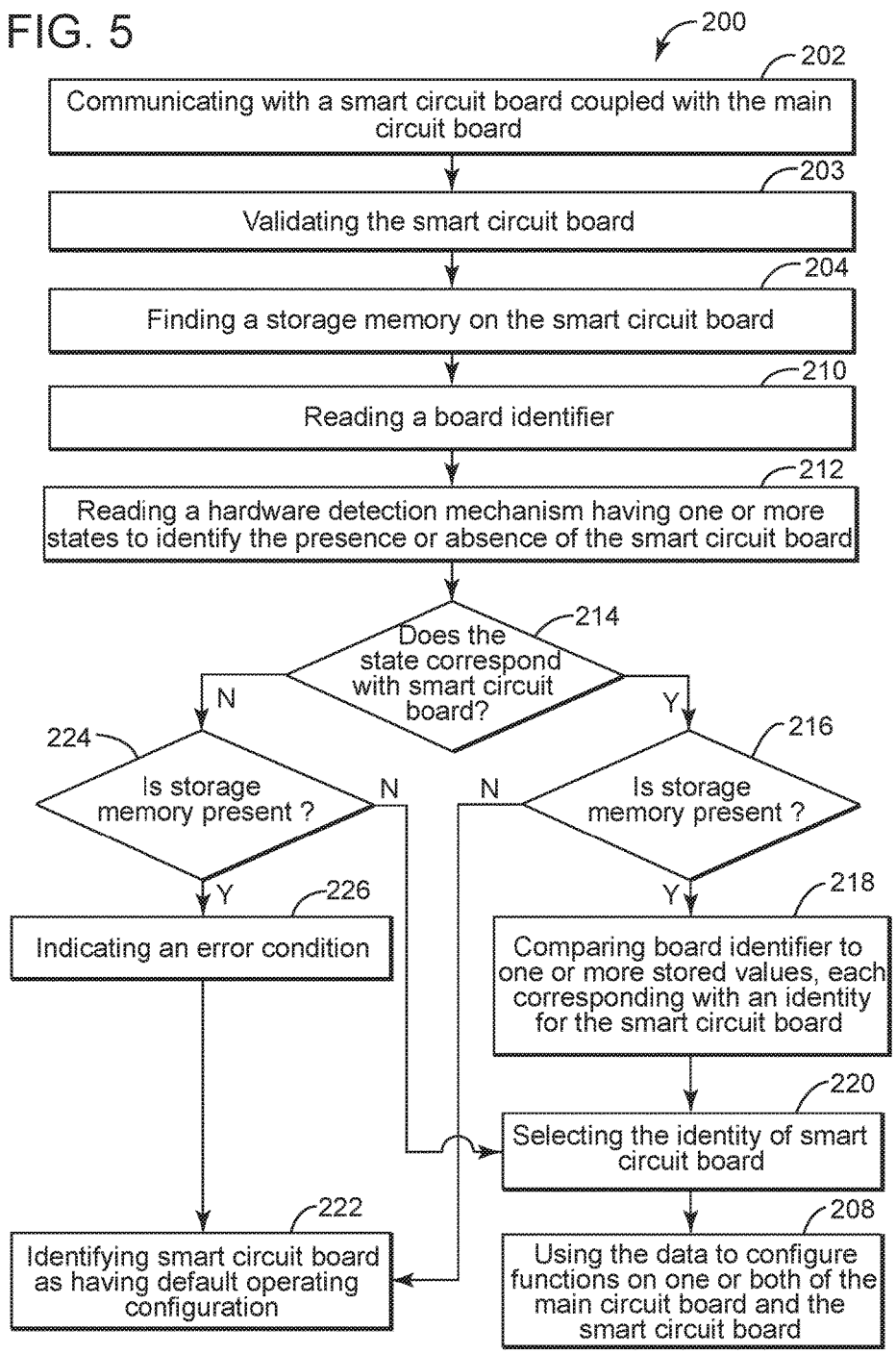
FIG. 5 depicts a flow diagram of an exemplary embodiment of a method for expanding functionality on a process device.

FIGS. 4 and 5 illustrate a flow diagram for an exemplary embodiment of a method 200 to automatically integrate the circuit boards 116, 118 (FIGS. 1, 2, and 3). These diagrams outline stages that may embody executable instructions for one or more computer-implemented methods and/or programs. With reference also to FIG. 2, the executable instructions may be stored locally so as to be accessible to the microcontroller 146 for use by the main circuit board 116. The device may also be configured for the microcontroller 146 to access the executable instruction in a remote location, e.g., storage in the "cloud." In use, the microcontroller 146 may be configured to execute the executable instructions in a way that can utilize the data found on the smart circuit board 118. The stages in these methods can be altered, combined, omitted, and/or rearranged in some embodiments In FIG. 4, the method 200 can include, at stage 202, communicating with the smart circuit board. The method 200 may initiate this stage in response to a power cycle, for example, introducing a power signal to one or more of the main circuit board and the smart circuit board. This power cycle may be required to swap out the smart circuit board in favor of one with a different configuration. The method 200 can also include, at stage 203, validating operation of the smart circuit board as part of a board-level assembly, at stage 204, finding a storage memory on the smart circuit board and, at stage 206, retrieving data from the storage memory. The method 200 may further include, at stage 208, using the data to configure functions on the main circuit board. In one implementation, the method 200 may include one or more stages for installing executable instructions from the data and/or for storing calibration data from the data.

At stage 203, the method 200 may validate the smart circuit board 118. Implementation of this stage may ensure the integrity, validity, or consistency of this component. This feature may validate operation of the smart circuit board 118 as part of the board-level assembly 114 to avoid problems that may arise as the main circuit board 116 attempts to initiate the functionality of the smart circuit board 118. In one implementation, the method 200 may include one or more stages for reading validating data from the smart circuit board and processing the validating data to ensure that the data on the storage memory 160 is correct (or incorrect, as desired). Examples of the validating data may correspond with the data found on the storage memory 160 or elsewhere on the smart circuit board 118. Suitable validating data may define information (also, "validating information") that is redundant of the information that is defined by the data found on the storage memory 160. In this way, the method 200 can detect problems with the smart circuit board 118 should the validating information not match the information that is defined by the data found on the storage memory 160 or defined by data stored on the main circuit board 116 for this purpose.

Detection of problems or "failure" to validate the smart circuit board 118 may give way to alerts or indicators. Such alerts and indicators may prevent improper operation of the valve positioner 100 with the "invalid" smart circuit board 118. The method 200 may include, for example, one or more stages for generating an output in response to a problem with the validity of the smart circuit board 118. Examples of this output may manifest in signals (e.g., audible, visual, tactile, etc.) that indicate that the integrity of the smart circuit board 118 is improper or compromised. These signals may correspond with illumination of a light (e.g., light emitting diode 154) or sound emanating from a speaker. Other forms of communication, like electronic messaging, text messaging, and computer-based messaging via user interface, is also possible under the present disclosure. In one implementation, the output may cause the valve positioner 100 to change between one or more operating modes. These operating modes may correspond with varying levels of functionality for the valve positioner 100, with reduced and limited functionality signifying lower levels or functionality. For example, the valve positioner 100 may change from a first operating mode to a second operating mode in which the valve positioner 100 has less functionality that the first operating mode in response to the smart circuit board 118 coupled into the board-level assembly 114 is invalid (or, otherwise, not useable in the device). In one implementation, the second operating mode corresponds with a fail-safe mode that effectively shuts the valve positioner 100 down to prevent any, or limited, function of the valve assembly 102.

At stage 204, the method 200 may find the storage memory 160 on the smart circuit board 118. For example, the microcontroller 146 may execute a series of commands that exchanges signals between the circuit boards 116, 118 and the components found thereon. These commands may interrogate the topology of the circuit boards 116, 118 and the components, possibly resulting in a "handshake" that allows the microcontroller 146 to access and retrieve the data on the storage memory 160. The handshake may require that the components exchange certain data, signals, and the like.

At stage 206, the method 200 may retrieve data from the storage memory 160 on the smart circuit board 118. This stage may include one or more stages for configuring the microcontroller 146 for copying the data to secondary storage memory found locally, either as part of the microcontroller 146 or elsewhere on the main circuit board 116 or the valve positioner 100, generally.

At stage 208, the method 200 may configure the functions of one or both of the main circuit board 116 and the smart circuit board 118. These configurations may include new functions, e.g., if the data on the smart circuit board 118 includes new executable instructions that update existing instructions on the main circuit board 116. These new functions may change calibration data and features; although this disclosure contemplates myriad functions that may be useful to implement via integration of the smart circuit board 118 into the board-level assembly 114. In other implementations, the configuration of the main circuit board 116 may be set to accommodate functions that are executed on or by the smart circuit board 118. Examples of these functions may transmit and retransmit data, provide additional processing of data, and the like.

FIG. 5 illustrates additional stages for the method 200 that may be useful to properly configure the board-level assembly 114 (FIGS. 1 and 2) to integrate the data and functionality found on the smart circuit board 118 (FIGS. 1, 2, and 3). The method 200 may include, at stage 210, reading a board identifier from among the data and, at stage 212, reading a hardware detection mechanism having one or more states to identify the presence or absence of the smart circuit board. For example, the hardware detection mechanism may embody a pin of a connector on the main circuit board. The pin "state" may vary between, for example, a first state and a second state that is different from the first state. These states may correspond with voltage (or current) at the pin so as to nominally identify a "high" and a "low" for the first state and the second state, respectively. In one implementation, the board identifier may embody an alpha-numeric code (e.g., a serial number) that corresponds with the particular configuration of the smart circuit board.

As also shown in FIG. 5, the method 200 may include, at stage 214, determining whether the state corresponds with presence of the smart circuit board. Changes in the hardware detection mechanism, for example, in the pin state from "low" to "high," may indicate that the smart circuit board is coupled with the main circuit board. If affirmative, the method 200 may include, at stage 216, determining whether the storage memory is present on the smart circuit board and, if so, include, at stage 218, comparing the board identifier to one or more stored values, each corresponding with an identity for the smart circuit board. The method 200 can then continue, at stage 220, selecting the identity of the smart circuit board and, at stage 208, using the data from the smart circuit board to configure functions on the main circuit board. If the storage memory is not present, the method 200 may continue at stage 222, identifying the smart circuit board as having a default operating configuration. This stage allows the main circuit board to operate without the addition of any new features or functions (and, in light of the discussion above, to maintain operation of the valve assembly 102 in its original "personality").

Returning back to stage 214, if the pin state does not correspond with presence of the smart circuit board, the method 200 may also be configured, at stage 224, to determine whether the storage memory is present. This stage may be useful for certain configurations of the smart circuit board that will not register the pin state as "present." Thus, if the storage memory is not present, the method 200 may continue, at stage 220, selecting the identity of the smart circuit board and, in one implementation, the identity may correspond to a pre-determined value that relates to the "absent" pin state and the lack of storage memory. In one implementation, if the storage memory is present, the method 200 may continue, at stage 226, indicating an error condition and, at stage 222, identifying the smart circuit board as having a default operating configuration. These stages are useful because failure to identify the "present" pin state, but to identify the storage memory, may not be a possible configuration and, thus, may indicate one or more failures at the one of the main circuit board and smart circuit board.

Figure 6:
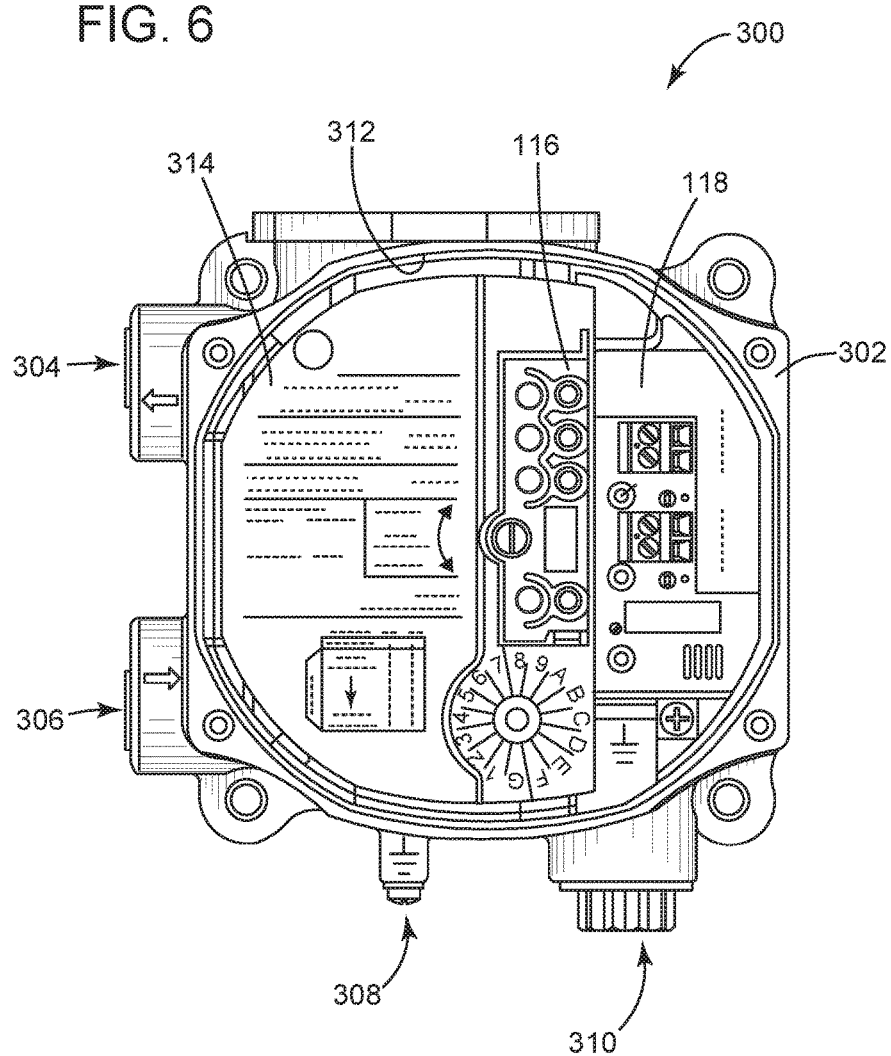
FIG. 6 depicts an elevation view of an example of the controller of FIG. 1.
Figure 7:
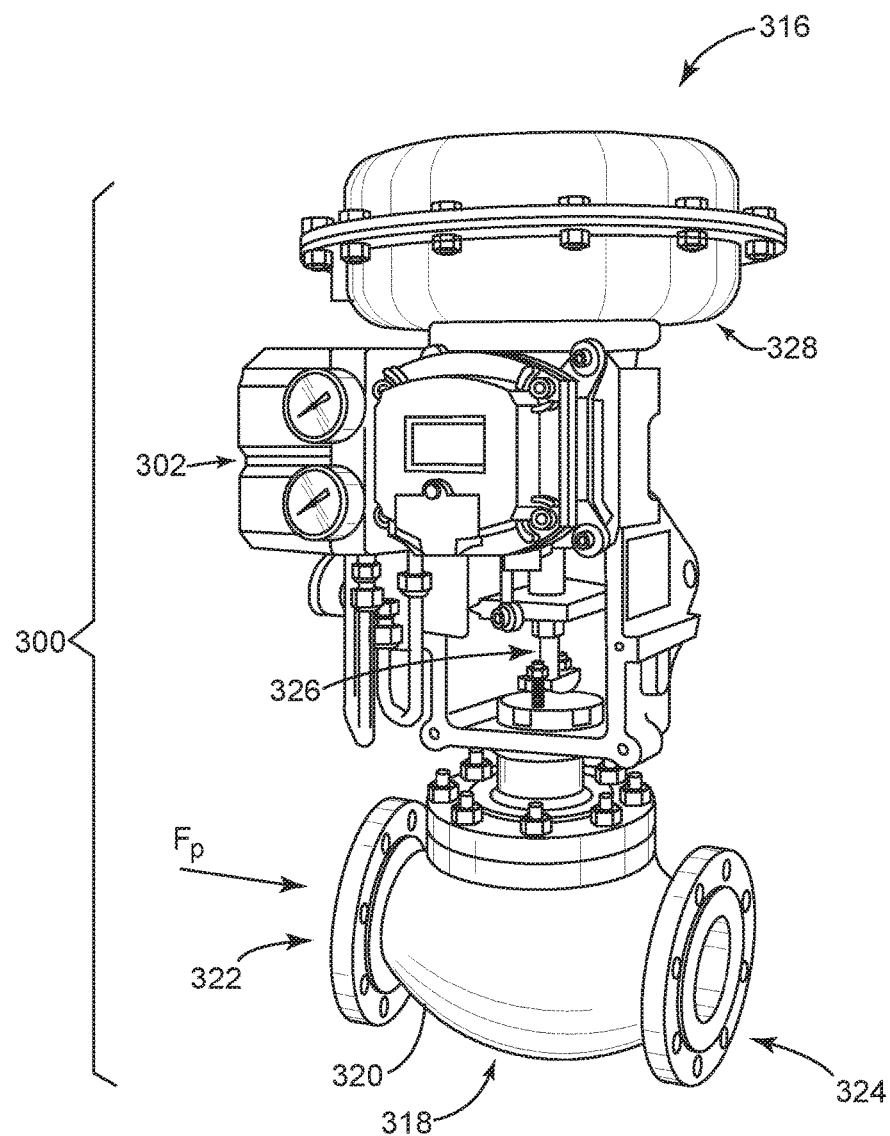
FIG. 7 depicts a perspective view of an example of the valve assembly of FIG. 1.

FIGS. 6 and 7 depict an exemplary structure 300 for use in connection with the valve positioner 100 and the valve assembly 102 contemplated hereinabove. These examples can be useful to regulate process fluids in industrial process lines typical of industries that focus on chemical production, refining production, and resource extraction. FIG. 6 shows an elevation view of the structure 300 as relates to use with the valve positioner 100. FIG. 7 depicts a perspective view of the structure 300 as relates to use with the valve assembly 102.

Turning first to FIG. 6, the structure 300 can have components that facilitate operation of the valve positioner 100 (FIG. 1) to generate a pneumatic signal to the actuator 104. These components can include a housing 302 that forms one or more input/outputs to exchange air and electrical signals. The housing 302 may embody a casting, although the features of the device may be machined from a single block or "billet" of material (e.g., metal). This casting can form a pair of pneumatic input/outputs (e.g., a first pneumatic input/output 304 and a second pneumatic input/output 306). The casting can also form a pair of electrical input/outputs (e.g., a first electrical input/output 308 and a second electrical input/output 310). The casting may further form a central open region 312 that can receive the circuit boards 116, 118. A cover plate 314 may be disposed at least partially over the central open region 308. Examples of the cover plate 310 can have various instructive areas 312 that can provide information in the form of text, images, diagrams, and other features. Collectively, these features can provide visual instruction as to the operation of the valve positioner 100 (FIG. 1).

FIG. 7 depicts the structure 300 to include an example of the valve assembly 102. This example embodies a control valve 316 that includes a fluid coupling 318 with a body 320, preferably cast from materials appropriate for use with the process fluids. The body 320 can have a first inlet/outlet 322 and a second inlet/outlet 324. The fluid coupling 318 can incorporate components of a valve (e.g., valve 106 of FIG. 1) inside of the interior to the body 302 and, thus, these components (e.g., plug 110 and seat 112 of FIG. 1) are not shown in the present view. An elongate shaft 326 may be used as the valve stem (e.g., valve stem 108 of FIG. 1) to couple a pneumatic actuator 328 with the components of the valve. This structure can modulate a flow of process fluid $F_P$ between the inlet/outlets 322, 324.

Figure 8:
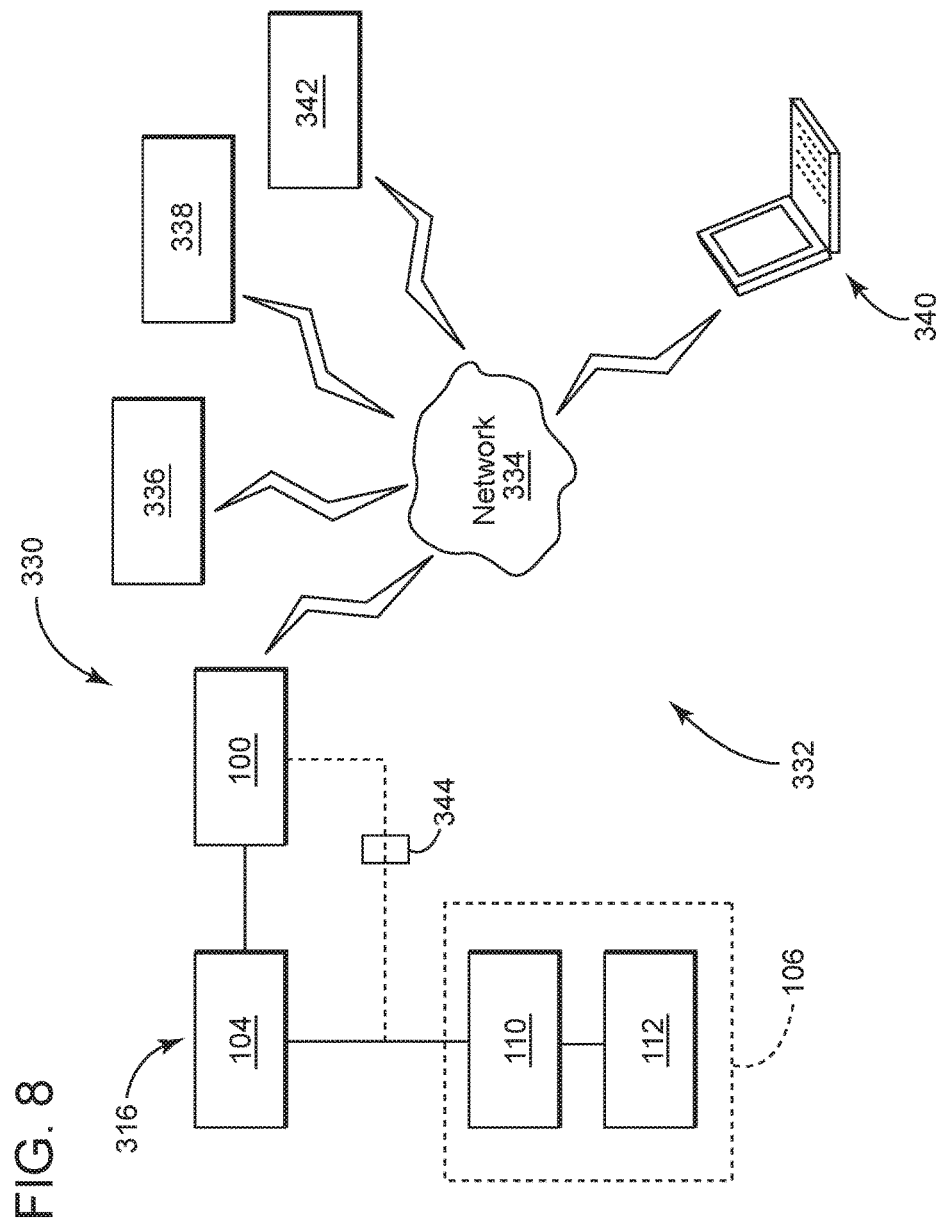
FIG. 8 depicts a schematic diagram of an example of a control system that can exchange signals with one or more controllers, e.g., the controller of FIG. 1.

FIG. 8 depicts a schematic diagram of the control valve 316 as part of a control system 330. In this example, the system 330 can include a network system 332 that includes a network 334. Examples of the network 334 can transfer data, information, and signals by way of wired protocols (e.g., 4-20 mA, FOUNDATION® Fieldbus, HART® etc.) and/or wireless protocols, many of which find use in a plant or factory automation environment. These protocols may facilitate communication over the network 334 between the control valve 316, a process controller 336, a management server 338, a terminal 340, and/or an external server 342. During operation, the process controller 336 can execute one or more computer programs to deliver a command signal to the valve positioner 100. The command signal may identify a commanded position for the plug 110. The valve positioner 100 can use the commanded position to modulate the instrument gas to the actuator 104 and, effectively, allow the plug 110 to move relative to the seat 112. As noted herein, the control valve 316 may include a positioner sensor 344 to provide feedback to the valve positioner 100 with the position of the valve stem 108. This position corresponds with the location and/or position of the plug 110 relative to the seat 112.

Data may reside on a data source, often locally in one or more memories on the valve positioner 100, although this disclosure also contemplates configurations in which the data resides on the system 330. For example, the data source may integrate with the management server 338 and/or as part of the external server 342. At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in memory. For real-time use of the methods, the data samples may be read into a buffer and/or like configured storage medium that allows for ready access to the data samples to afford the methods with chronologically relevant data, taking into consideration necessary data processing time-lag. In one embodiment, the methods may include one or more stages for obtaining and/or retrieving the data from the data source.

FIG. 9 depicts a flow diagram of an exemplary embodiment of a method 400 to update functionality on a valve positioner. The method 400 may include, at stage 402, removing a power signal to the valve positioner. This stage may include, for example, actuating one or more switches or, possibly, removing one or more wires connecting the valve positioner to a power source. It may also be prudent, and necessary, to include stages for mechanically locking the position of the plug relative to the seat to allow the valve assembly to continue to operate during this maintenance. In one implementation, the method 400 may include, at stage 404, removing a cover from the valve positioner and, at stage 406, locating the board-level assembly. At stage 408, the method 400 may include disconnecting a first smart circuit board from the main board. The method 400 may further include, at stage 410, connecting a second smart circuit board to the main circuit board, wherein the second smart circuit board is configured with data that is different from the first smart circuit board. The stages 408, 410 may leverage quick release connectors, although this disclosure does contemplate the need for tools (e.g., screwdriver) to appropriately manipulate the connectors to engage and disengage the smart circuit boards. In one implementation, the method 400 may further include, at stage 412, securing the second smart circuit board in the valve positioner, at stage 414, reattaching the cover to the valve positioner and, at stage 416, introducing the power signal to the valve positioner. The main circuit board may respond to the power signal by automatically communicating with the second smart circuit board to access the data stored thereon.

One or more of the embodiments may be implemented on any device where relevant data is present and/or otherwise accessible. For example, the embodiments can be implemented as executable instructions (e.g., firmware, hardware, software, etc.) on the valve positioner. A valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computing device. The historian can be connected to the asset management system or distributed control system. The diagnostic computing device has all the capabilities of the monitoring computer and, often, the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as the DCS or may be connected directly to the diagnostic computer).

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). As noted herein, exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the disclosed subject matter may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
a valve including a position-lockable plug;
a pneumatic actuator coupled with the valve;
a valve stem connected to the valve and to the pneumatic actuator;
a position sensor;
a valve positioner coupled with the pneumatic actuator to deliver a pneumatic signal that causes the pneumatic actuator to change position of the valve, wherein the valve positioner is operative to identify a commanded position for the position-lockable plug in response to a control signal and a position for the valve stem from the position sensor, the valve positioner comprising,
a housing; and
a board-level assembly disposed in the housing, the board-level assembly comprising,
a first circuit board with a microprocessor residing in the housing; and
a second circuit board in communication with the first circuit board and also resident in the housing, the second circuit board removeably replaceable from the housing and the board level assembly with the position-lockable plug in its locked state and power off to the valve positioner, the second circuit board having functions that are different from the first circuit board,
wherein, in response to a power signal, the microprocessor is configured to,
communicate with the second circuit board when coupled with the first circuit board;
validate operation of the second circuit board as part of the board-level assembly;
find a storage memory on the second circuit board;
retrieve data from the storage memory; and
use the data to configure functions on the first circuit board.

2. The valve assembly of claim 1, wherein the second circuit board includes a checksum value that corresponds to the operation of the second circuit board as part of the board-level assembly, and wherein the microprocessor is configured to read the checksum value to validate the operation of the second circuit board as part of the board-level assembly.

3. The valve assembly of claim 1, wherein the second circuit board includes a power-limiting device that is configured to regulate temperature of components found thereon.

4. The valve assembly of claim 3, wherein the power-limiting device is configured to block voltage to the components.

5. The valve assembly of claim 1, wherein the microprocessor is configured to install executable instructions from the data.

6. The valve assembly of claim 1, wherein the microprocessor is configured to store calibration data from the data.

7. The valve assembly of claim 1, wherein the microprocessor is configured to read a board identifier from among the data and assign an identity to the second circuit board in response to the board identifier, and wherein the identity relates to the operative functions of the second circuit board.

8. The valve assembly of claim 1, wherein the microprocessor is configured to read a hardware detection mechanism having one or more states to identify presence or absence of the second circuit board.

9. The valve assembly of claim 1, wherein the data defines a first function for the second circuit board that are not found on the first circuit board.

10. The valve assembly of claim 1, wherein the second circuit board includes a power-limiting device comprising a galvanic insulator that is configured to regulate temperature of components found thereon.

11. The valve assembly of claim 1, wherein the microprocessor is configured to read a checksum value from memory on the second circuit board to validate the operation of the second circuit board as part of the board-level assembly.

12. The valve assembly of claim 1, wherein the-board level assembly has a first connector and a second connector, one each configured to exchange a power signal and a data signal, respectively, between the first circuit board and the second circuit board.

13. The valve assembly of claim 1, wherein the board level assembly has a connector with a pin, wherein the microprocessor is configured to read a pin state for the pin, and wherein the identity relates to the pin state.

14. The valve assembly of claim 1, wherein the functions are in addition to functions of the first circuit board when in a default configuration.

15. The valve assembly of claim 1, wherein the second circuit board defines functions that are not available on the first circuit board when in a default configuration.

16. The valve assembly of claim 1, wherein the second circuit board comprises power-limiting devices to maintain components below a flash point temperature of natural gas.

17. The valve assembly of claim 1, wherein the valve positioner is operative to modulate instrument gas to the pneumatic actuator in response to a control signal that defines operating parameters for a process line.

18. The valve assembly of claim 1, further comprising:
a fluid coupling that incorporates the position-lockable plug.

19. The valve assembly of claim 1, further comprising:
a removable cover on the housing that encloses the first circuit board and the second board.

* * * * *